United States Patent Office 2,981,027
Patented Apr. 25, 1961

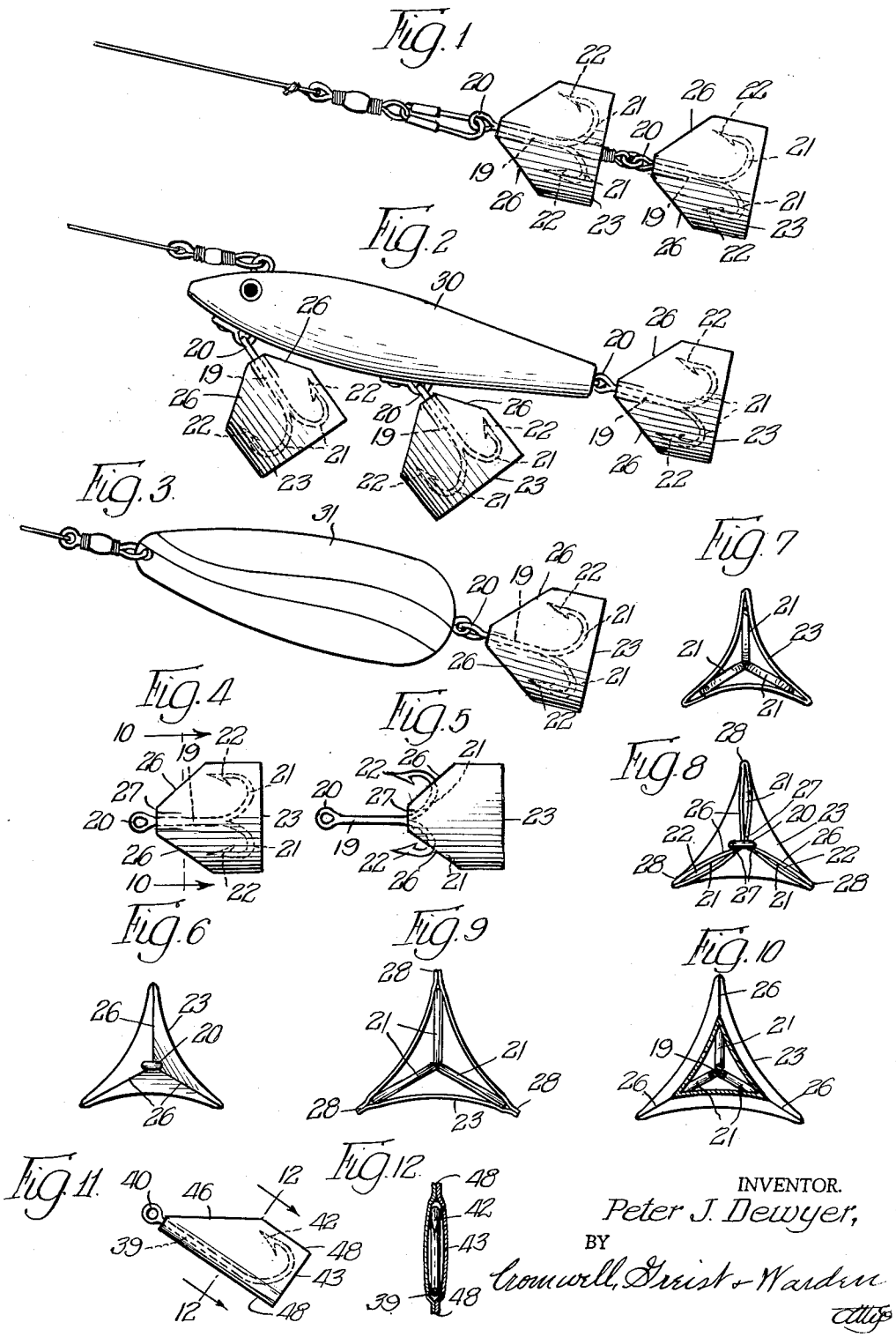

2,981,027

WEEDLESS FISHHOOKS

Peter J. Dewyer, Box 272, Libertyville, Ill.

Filed Apr. 1, 1958, Ser. No. 725,704

4 Claims. (Cl. 43—42.1)

This invention relates to a fishhook and more particularly to a triple fishhook having a protective shroud adapted to prevent entanglement of the hook with weeds. As used herein the term hook covers single or multiple hooks.

One of the irritating problems commonly encountered by fishermen in trolling, casting, or still fishing is the problem of entanglement of their hooks with weeds. This often results in the breakage of line, and the loss of plugs, hooks, sinkers, etc.

It is therefore, the general object of this invention to provide a new and improved fishhook having a protective skirt or shroud adapted to prevent entanglement of the hook with weeds yet which will not hinder or reduce the effectiveness of the barbs in hooking a fish.

Another object of the invention is to provide a new and improved fishhook having a protective shroud which normally covers the barbed ends of the fishhook to prevent entanglement thereof with weeds but which is shiftable rearwardly of the hook to expose the barbs when a fish strikes.

Another object of the invention is to provide such a fishhook wherein the shroud is formed of a water-resistant, membrane-like material and wherein the shroud may be formed either of a single piece of such material or from a plurality of sections of such material sealed together along adjacent meeting edges thereof.

A still further object of the invention is to provide such a fishhook wherein the shroud has a biased or inclined leading edge immediately forward of each barb of the hook and wherein the leading edges are either slit or readily pierceable by the barbs to permit exposure of the barbs when a fish strikes and the shroud is shifted rearwardly of the hook.

A more particular object of the invention is to provide a new and improved triple-barbed hook having a three-sided protective shroud with the sides thereof being concave in configuration so as to lightly grip the barbs of the hook disposed in the corners defined by adjacent sides of the shroud.

A still further object of the invention is to provide a new and improved shrouded fishhook adapted to prevent entanglement of the hook with weeds wherein the shroud may either be formed separately and slipped onto a fishhook or may be initially formed on the fishhook.

Another object of the invention is to provide such a shrouded fishhook wherein the shroud may be provided with painted markings and trailing projections in the form of legs, wings or fins to increase its attractiveness as a fish lure.

Yet another object of the invention is to provide a fishhook of the character described which is very economical to produce and very simple to assemble.

Certain other objects of the invention will, in part, be obvious, and will in part appear hereinafter. For a more complete understanding of the nature and scope of the invention reference may now be had to the accompanying drawings wherein:

Fig. 1 is a side elevational view of a pair of triple-barbed, weedless fishhooks embodying the invention attached to a line for use as a fishing lure;

Fig. 2 is a side elevational view of a plug having a series of shrouded, triple-barbed hooks attached thereto;

Fig. 3 is a side elevational view of a spoon or daredevil having a shrouded triple-barbed hook attached thereto;

Fig. 4 is a side elevational view of a shrouded, triple-barbed fishhook showing the shroud in its normal weed-deflecting position;

Fig. 5 is a side elevational view of the hook shown in Fig. 4 showing the shroud shifted rearwardly of the hook to expose the barbs as when a fish strikes;

Fig. 6 is a front end elevational view of a shrouded triple-barbed hook wherein the shroud is formed of a single piece of water-resistant, membrane-like material;

Fig. 7 is a rear end elevational view of the hook shown in Fig. 6;

Fig. 8 is a front end elevational view of a shrouded, triple-barbed hook wherein the shroud is formed of three separate sections of water-resistant, membrane-like material sealed together along a portion of the meeting edges thereof but with the leading edges disposed forwardly of each barb being unsealed;

Fig. 9 is a rear end elevational view of the hook shown in Fig. 8;

Fig. 10 is an enlarged vertical sectional view taken generally on the line 10—10 of Fig. 4 and showing a triple hook having a shroud formed of a single piece of material;

Fig. 11 is a side elevational view of a shrouded, single-barbed hook; and

Fig. 12 is a vertical sectional view taken generally along line 12—12 of Fig. 11.

The fishhooks shown in the drawings are conventional types which may be described generally as having a shank 19, a line attaching eye 20 at one end thereof with the other end 21 being curved in the form of a semi-circle and terminating in a barbed end 22 which extends forwardly in the direction of the eye 20. The principles of the invention are applicable equally well to multiple barbed hooks such as the triple-barbed hooks illustrated in Figs. 1–10 and to single-barbed hooks as illustrated in Figs. 11 and 12.

In order to prevent fouling or entanglement of the hooks shown in the drawings with seaweed and the like, a protective skirt or shroud 23 is provided which normally covers the barbed ends 22 of the hook but which is shiftable rearwardly of the hook when a fish strikes to expose the barbed ends 22.

Each shroud 23 shown on the triple-barbed hooks of Figs. 1–10 has three sides longitudinally enclosing the hook. Each of the three edges of a three-sided shroud is aligned with one of the barbed ends 22 of a hook and includes portion 26 extending forwardly of each barbed end 22, which may be biased or inclined toward the shank 19 of the hook, to prevent entanglement of the barbed ends 22 with seaweed or the like. The eye 20 of each hook extends through a small opening in the forward end of each shroud 23 with the larger rear end of each shroud being left open, as shown in Figs. 7 and 9.

Each shroud 23 is formed of a thin, membrane-like material, such as water-resistant treated paper, plastic, or synthetic or natural rubber, which is sufficiently stiff to hold its desired shape. The shroud 23 of this invention may either be molded so as to form a one-piece shroud adapted to be slipped over a hook from the forward end thereof or may be formed of three identical or symmetrical sections of such material which may be either assembled directly on a hook or pre-assembled and then fitted over a hook. A single-piece shroud is shown in Figs. 6, 7 and 10 with a shroud formed of three sections of such material being shown in Figs. 8 and 9. In assembling the shroud formed of three symmetrical sections of such material, the meeting edges of adjacent sections may be sealed together, at least the portions 27 immediately adjacent the shank 19 of the hook and the portions 28 extending alongside the barbed ends 22 of the hook, as best shown in Figs. 8 and 9.

As shown in Fig. 4, the shroud 23 normally longitudinally encloses the hook so that the biased leading edge portions 26 extend forwardly of each barbed end 22 thereof whereupon any contact of the shrouded hook with seaweed or the like permits the hook to slide or glance off the weed or vice versa to prevent entanglement of the hook therewith. However, as shown in Fig. 5, when a fish strikes the hook, the shroud 23 is shifted rearwardly of the hook so as to expose the barbed ends 22 thereof through the biased edge portions 26 and permit proper hooking of a fish. To permit this barb-exposing action, the biased leading edge portions 26 are readily pierceable due to the thin, membrane-like material from which each shroud is formed. In the shroud formed of three sections of such material the biased leading edge portions 26 of the meeting edges of adjacent sectons may be left unsealed, as shown in Fig. 8, so as to more easily permit exposure of the barbed ends 22 of the hook therebetween when a fish strikes.

As shown in Figs. 6–10, the barbed ends 22 of each hook are disposed in the corners of its shroud 23 defined by the adjacent sections thereof, the sections preferably being formed with a concave configuration as illustrated in the drawings so that the corners of the shroud lightly grip the barbed ends 22 of each hook. This concave configuration of the sides of the shroud additionally increases the streamline effect thereof and reduces the water disturbance as the hook is drawn through the water, as in trolling.

The shrouds 23 may be provided with various colored markings and with trailing portions shaped like legs, wings or fins so that the shrouds will simulate live bait and have an increased attractiveness as a lure. In Fig. 1, a pair of shrouded triple-barbed hooks are shown secured to a fishing line for use as a bait themselves whereas in Figs. 2 and 3 such shrouded triple-barbed hooks are shown attached to a plug 30 and a spoon or daredevil 31, respectively, of types commonly found in tackle boxes.

Figs. 11 and 12 illustrate a single-barbed hook having a shank 39, an eye 40, and a barbed end 42 in combination with a protective shroud 43. This shroud 43 may be formed either of a single piece of membrane-like, treated material or of two sections of such material sealed together along portions 48 of the meeting edges thereof, as shown in Fig. 12 particularly. A biased leading edge portion 46 extending forwardly of the barbed end 42, as discussed with regard to the embodiment shown in Figs. 1–10, is either pierceable by the barbed end 42 or nonsealed so as to permit exposure of the barbed end 42 when a fish strikes shifting the shroud 43 rearwardly of the hook.

As disclosed herein, one of the basic purposes of the invention is the development of a shrouded fishhook adapted to prevent seaweed and the like from becoming entangled with the barbed ends of the hook. The shroud, when in its normal position, being effective to prevent seaweed or the like from becoming entangled with the hook but being shiftable rearwardly of the hook when a fish strikes to expose the barbed ends thereof through the pierceable or slotted leading edges of the shroud to render the hook effective to properly hook a fish. The shrouds disclosed herein may either be formed on a conventional fishhook, either single-barb or multi-barb, or may be formed separately and later fitted over conventional fishhooks. Additionally the shroud disclosed herein when properly camouflaged with desired markings and appendages changes a conventional fishhook into an attractive bait or lure and may be utilized as shown in Fig. 1.

It will be understood that certain changes may be made in the construction or arrangement of the weedless fishhook disclosed herein without departing from the spirit and scope of the invention as defined in the appended claims.

I claim:

1. In combination with a triple-barbed fishhook, a rearwardly shiftable, protective shroud longitudinally enclosing the hook to normally prevent entanglement of the barbs thereof with weeds, said shroud being formed of three symmetrical sections of water-resistant, membrane-like material having edge portions sealed to each other to form a three-sided shroud, each of the barbs being disposed in a corner of the shroud defined by the sealed edges of a pair of adjacent sections, said sealed edges extending in front of the barbs and being pierceable by the barbs to permit exposure thereof when a fish strikes and shifts the shroud rearwardly.

2. In combination with a triple-barbed fishhook, a protective shroud for preventing entanglement of the barbs with weeds, said shroud being formed of water-resistant, membrane-like material and having three integral sides longitudinally enclosing the hook with each barb being disposed at a vertex defined by a pair of the sides of the shroud, said shroud having three pierceable edges each extending in front of one of the barbs, said shroud being bodily shiftable rearwardly of the hook to expose the barbs through said pierceable edges when a fish strikes.

3. In combination with a triple-barbed fishhook, a protective shroud for preventing entanglement of the barbs with weeds, said shroud being formed of water-resistant, membrane-like material and having three integral, concave sides longitudinally enclosing the hook so that each barb is lightly gripped by a pair of the sides of the shroud at the vertex thereof, said shroud having three pierceable edges each extending forwardly of one of the barbs and inclined toward the shank of the hook, said shroud being bodily shiftable rearwardly of the hook to expose the barbs through said pierceable edges when a fish strikes.

4. A weed guard for a triple-barbed fishhook comprising, a rearwardly shiftable, protective shroud adapted to longitudinally enclose such a hook to normally prevent entanglement of the barbs thereof with weeds, said shroud being formed of three symmetrical sections of water-resistant, membrane-like material having edge portions sealed to each other to form a three-sided shroud, each of the barbs of the hook being adapted to be disposed in a corner of the shroud defined by the sealed edges of a pair of adjacent sections, said sealed edges being adapted to extend in front of the barbs and to be pierceable by the barbs to permit exposure thereof when a fish strikes and shifts the shroud bodily rearwardly.

References Cited in the file of this patent

UNITED STATES PATENTS

| | | |
|---|---|---|
| 539,149 | Shattuck | May 14, 1895 |
| 1,191,031 | Peters | July 11, 1916 |
| 2,261,068 | Mackovick | Oct. 28, 1941 |
| 2,616,209 | Ploen | Nov. 4, 1952 |
| 2,618,095 | Igo | Nov. 18, 1952 |
| 2,711,611 | Miner | June 28, 1955 |
| 2,811,804 | Heath | Nov. 5, 1957 |

FOREIGN PATENTS

| | | |
|---|---|---|
| 1,545 | Great Britain | 1891 |